United States Patent
Chin et al.

(10) Patent No.: US 8,223,622 B2
(45) Date of Patent: Jul. 17, 2012

(54) METHODS AND SYSTEMS FOR MOBILE WIMAX THREE-WAY DOWNLINK CONCURRENT PROCESSING AND THREE-WAY HANDOVER

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 12/123,411

(22) Filed: May 19, 2008

(65) Prior Publication Data

US 2009/0285178 A1 Nov. 19, 2009

(51) Int. Cl.
- *H04J 11/00* (2006.01)
- *H04B 7/204* (2006.01)
- *H04B 7/208* (2006.01)
- *H04W 4/00* (2009.01)

(52) U.S. Cl. ........ 370/203; 370/319; 370/338; 370/344; 375/130

(58) Field of Classification Search .......... 370/203–211, 370/310–350; 375/130–152; 455/436–444
See application file for complete search history.

(56) References Cited

U.S. PATENT DOCUMENTS

| | | | |
|---|---|---|---|
| 7,072,315 B1* | 7/2006 | Liu et al. | 370/329 |
| 7,782,816 B2 | 8/2010 | Cho et al. | |
| 2005/0288020 A1 | 12/2005 | Cho et al. | |
| 2006/0089144 A1* | 4/2006 | Kim et al. | 455/439 |
| 2008/0013485 A1* | 1/2008 | Gorokhov et al. | 370/329 |
| 2008/0076432 A1 | 3/2008 | Senarath et al. | |
| 2008/0205364 A1* | 8/2008 | Park et al. | 370/338 |
| 2009/0129334 A1* | 5/2009 | Ma et al. | 370/331 |
| 2009/0201877 A1* | 8/2009 | Noh et al. | 370/330 |
| 2009/0323663 A1* | 12/2009 | Nakatsugawa | 370/343 |
| 2010/0067592 A1* | 3/2010 | Goldhamer | 375/260 |
| 2010/0111005 A1* | 5/2010 | Ahn et al. | 370/329 |
| 2010/0272004 A1* | 10/2010 | Maeda et al. | 370/312 |

FOREIGN PATENT DOCUMENTS

| | | |
|---|---|---|
| WO | WO2005120109 | 12/2005 |
| WO | WO2005125250 | 12/2005 |
| WO | WO2009057438 | 5/2009 |

OTHER PUBLICATIONS

International Search Report and Written Opinion—PCT/US2009/043475—ISA/EPO—Sep. 24, 2009.

* cited by examiner

*Primary Examiner* — Tri H Phan

(74) *Attorney, Agent, or Firm* — Charles Chesney

(57) ABSTRACT

Methods and apparatus for establishing multiple connections between a wireless device and multiple base stations and transferring data using these connections via different segments of an orthogonal frequency division multiple access (OFDMA) frame are provided. The multiple connections may be used for multi-way (e.g., three-way) concurrent processing, multi-way (e.g., three-way) handover, or a hybrid between concurrent processing and multi-way handover in an effort to increase data throughput for the wireless device.

19 Claims, 15 Drawing Sheets

| TYPE (1202) | DESCRIPTION (1204) | ADVANTAGE (1206) |
|---|---|---|
| 3-WAY CONCURRENT | EXCHANGING DATA WITH 3 DIFFERENT CONNECTIONS FROM 3 DIFFERENT BASE STATIONS HAVING DIFFERENT DATA AT THE SAME TIME | INCREASE BANDWIDTH USAGE SIGNIFICANTLY BY USING ALL 3 SEGMENTS |
| 3-WAY HAND-OVER(HO) | SELECTING BETWEEN THREE DIFFERENT CONNECTIONS FROM 3 DIFFERENT BASE STATIONS HAVING THE SAME DATA (ON A FRAME-BY-FRAME BASIS) | INCREASE DATA THROUGHPUT WITHIN ONE SEGMENT |
| HYBRID CONCURRENT/HO | SELECTING BETWEEN TWO CONNECTIONS WITH THE SAME DATA AND EXCHANGING DATA WITH A THIRD CONNECTION HAVING DIFFERENT DATA THAN THE FIRST TWO CONNECTIONS | INCREASE BANDWIDTH USAGE WITH 2 SEGMENTS AND INCREASE DATA THROUGHPUT WITHIN ONE SEGMENT |

FIG. 12

METHODS AND SYSTEMS FOR MOBILE WIMAX THREE-WAY DOWNLINK CONCURRENT PROCESSING AND THREE-WAY HANDOVER

TECHNICAL FIELD

Certain embodiments of the present disclosure generally relate to wireless communication and, more particularly, to establishing multiple connections between a wireless device and multiple base stations and exchanging data using these connections via different segments of an orthogonal frequency division multiple access (OFDMA) frame.

BACKGROUND

Orthogonal frequency-division multiplexing (OFDM) and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations. Typically, a mobile station (MS) only communicates with one base station (e.g., the serving base station) at a time. This BS allocates bandwidth to the MS based on the base station's own scheduling algorithm, and the MS is restricted from using bandwidth from other base stations.

SUMMARY

Certain embodiments of the present disclosure generally relate to establishing multiple connections between a wireless device and multiple base stations and exchanging data using these connections via different segments of an orthogonal frequency division multiple access (OFDMA) frame. The multiple connections may be used for multi-way (e.g., three-way) concurrent processing, multi-way (e.g., three-way) handover, or a hybrid between concurrent processing and multi-way handover.

Certain embodiments of the present disclosure provide a method. The method generally includes establishing a first connection with a first base station, wherein the first connection involves the transfer of data using a first signal based on a first segment of an OFDMA frame; establishing a second connection with a second base station, wherein the second connection involves the transfer of data using a second signal based on a second segment of the OFDMA frame; and exchanging data with the first and second base stations via the first and second connections within a time period bounded by the OFDMA frame.

Certain embodiments of the present disclosure provide a receiver for wireless communication. The receiver generally includes first connection-establishing logic configured to establish a first connection with a first base station, wherein the first connection involves the transfer of data using a first signal received by the receiver and based on a first segment of an OFDMA frame; second connection-establishing logic configured to establishing a second connection with a second base station, wherein the second connection involves the transfer of data using a second signal received by the receiver and based on a second segment of the OFDMA frame; and data logic configured to exchange data with the first and second base stations via the first and second connections within a time period bounded by the OFDMA frame.

Certain embodiments of the present disclosure provide an apparatus for wireless communication. The apparatus generally includes means for establishing a first connection with a first base station, wherein the first connection involves the transfer of data using a first signal based on a first segment of an OFDMA frame; means for establishing a second connection with a second base station, wherein the second connection involves the transfer of data using a second signal based on a second segment of the OFDMA frame; and means for exchanging data with the first and second base stations via the first and second connections within a time period bounded by the OFDMA frame.

Certain embodiments of the present disclosure provide a mobile device. The mobile device generally includes first connection-establishing logic configured to establish a first connection with a first base station, wherein the first connection involves the transfer of data using a first signal based on a first segment of an OFDMA frame; second connection-establishing logic configured to establishing a second connection with a second base station, wherein the second connection involves the transfer of data using a second signal based on a second segment of the OFDMA frame; and a receiver front end for receiving the first and second signals from the first and second base stations via the first and second connections within a time period bounded by the OFDMA frame.

Certain embodiments of the present disclosure provide a computer-readable medium containing a program for wireless communication, which, when executed by a processor, performs certain operations. The operations generally include establishing a first connection with a first base station, wherein the first connection involves the transfer of data using a first signal based on a first segment of an OFDMA frame; establishing a second connection with a second base station, wherein the second connection involves the transfer of data using a second signal based on a second segment of the OFDMA frame; and exchanging data with the first and second base stations via the first and second connections within a time period bounded by the OFDMA frame.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 12 is a chart comparing and listing the advantages of three-way concurrent processing, three-way handover, and a hybrid between them, in accordance with certain embodiments of the present disclosure.

DETAILED DESCRIPTION

Figure 1:
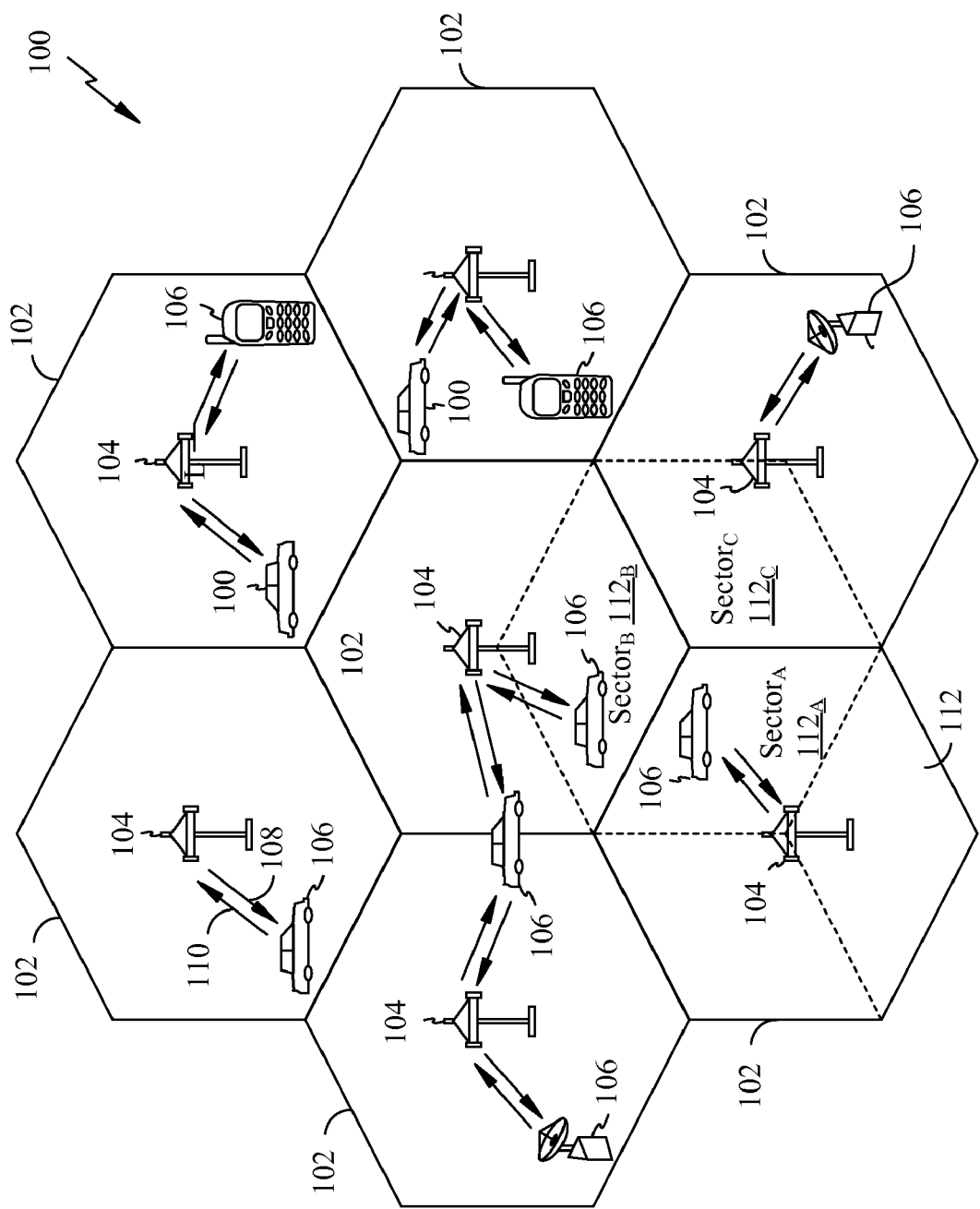
FIG. 1 illustrates an example wireless communication system, in accordance with certain embodiments of the present disclosure.

Certain embodiments of the present disclosure provide techniques and apparatus for establishing multiple connections between a wireless device and multiple base stations and exchanging data using these connections via different segments of an orthogonal frequency division multiple access (OFDMA) frame. The multiple connections may be used for multi-way (e.g., three-way) concurrent processing, multi-way (e.g., three-way) handover, or a hybrid between concurrent processing and multi-way handover in an effort to increase data throughput for the wireless device.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas. For example, base station $104_A$ may provide directional coverage for sector A $112_A$, base station $104_B$ may provide directional coverage for sector B $112_B$, and base station $104_C$ may provide directional coverage for sector C $112_C$ as illustrated in FIG. 1.

Figure 2:
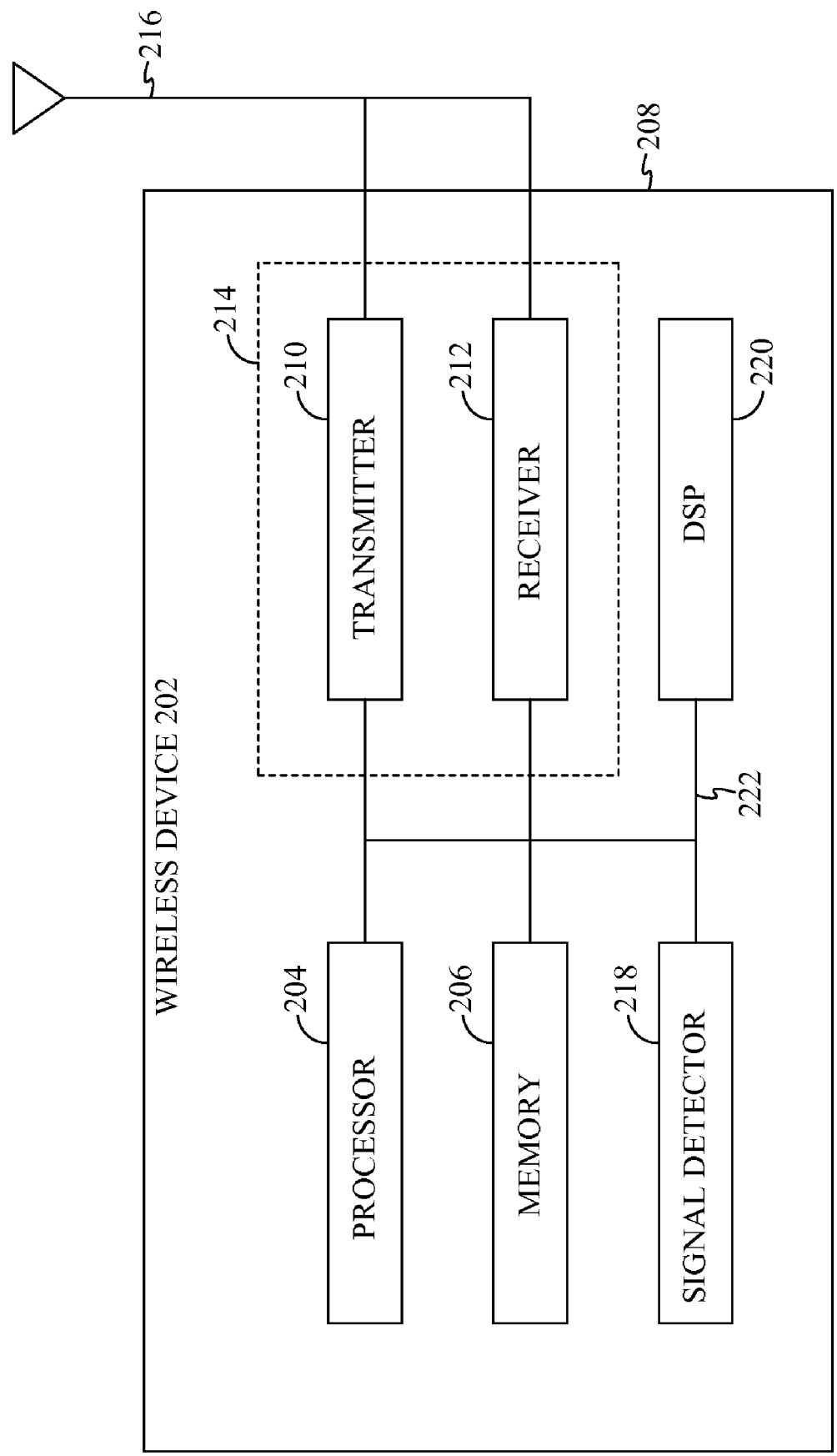
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
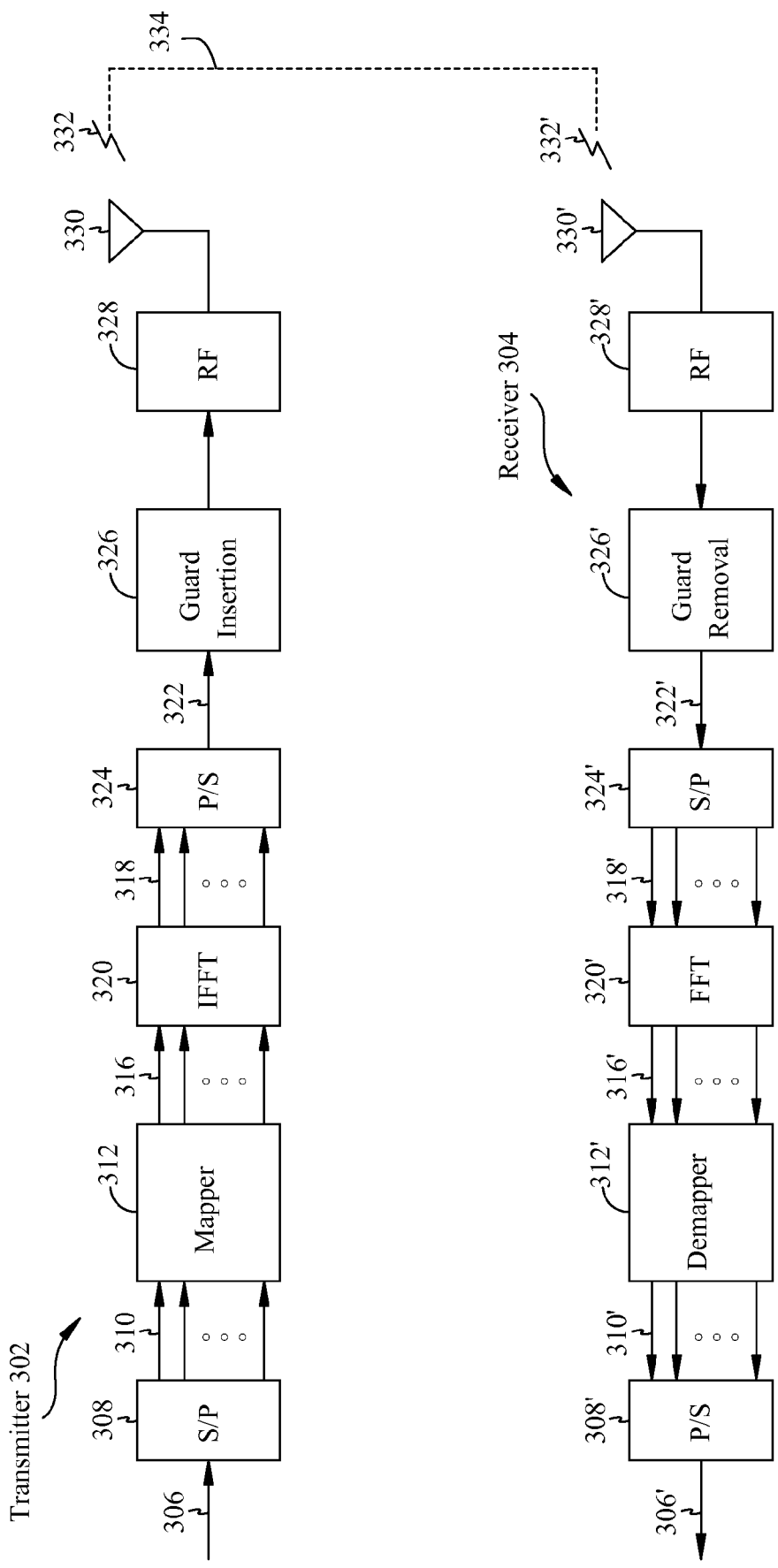
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDMA Frame

Figure 4:
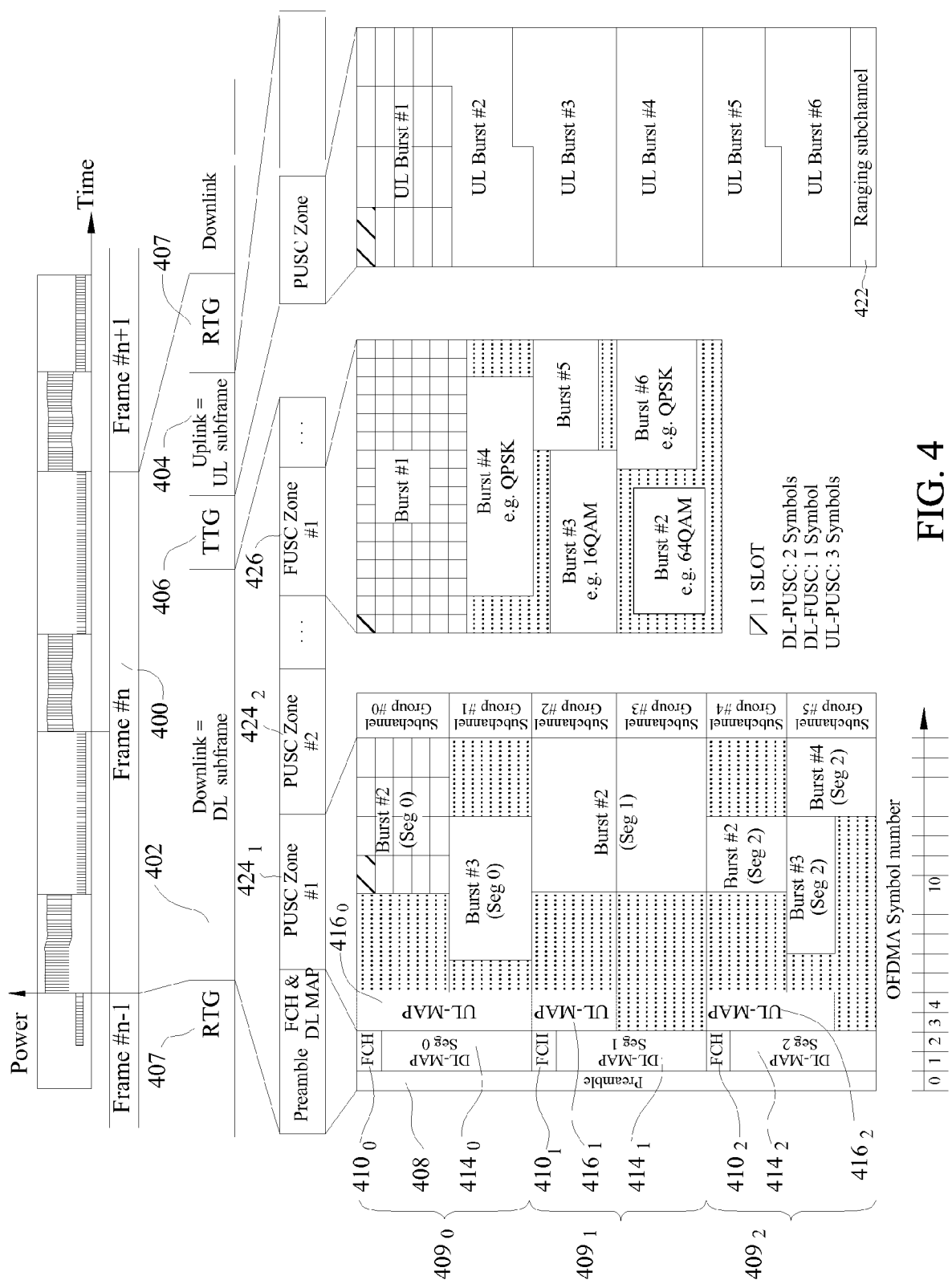
FIG. 4 illustrates an example OFDMA frame for Time-Division Duplex (TDD) with three segments, in accordance with certain embodiments of the present disclosure.

Referring now to FIG. 4, an OFDMA frame 400 for a Time-Division Duplex (TDD) implementation is depicted as a typical, but not limiting, example. Other implementations of an OFDMA frame, such as Full and Half-Duplex Frequency-Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval—or, more specifically, by Transmit/Receive and Receive/Transmit Transition Gaps (TTG 406 and RTG 407, respectively)—in an effort to prevent DL and UL transmission collisions. The DL-to-UL-subframe ratio may be varied from 3:1 to 1:1 to support different traffic profiles.

Within the OFDMA frame 400, various control information may be included. For example, the first OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments 409 of the zone are used. For example, carriers 0, 3, 6, . . . may indicate that segment 0 ($409_0$) is to be used, carriers 1, 4, 7, . . . may indicate that segment 1 ($409_1$) is to be used, and carriers 2, 5, 8, . . . may indicate that segment 2 ($409_2$) is to be used.

A Frame Control Header (FCH) 410 may follow the preamble 408, one FCH 410 per segment 409. The FCH 410 may provide frame configuration information, such as the usable subchannels, the modulation and coding scheme, and the MAP message length for the current OFDMA frame. A data structure, such as the downlink Frame Prefix (DLFP), outlining the frame configuration information may be mapped to the FCH 410. The DLFP for Mobile WiMAX may comprise a used subchannel (SCH) bitmap, a reserved bit set to 0, a repetition coding indication, a coding indication, a MAP message length, and four reserved bits set to 0. Before being mapped to the FCH 410, the 24-bit DLFP may be duplicated to form a 48-bit block, which is the minimal forward error correction (FEC) block size.

Following the FCH 410 in each segment 409, a DL-MAP 414 and a UL-MAP 416 may specify subchannel allocation and other control information for the DL and UL subframes 402, 404, respectively. In OFDMA, multiple users may be allocated data regions within the frame 400, and these allocations may be specified in the DL and UL-MAP 414, 416. The MAP messages may include the burst profile for each user, which defines the modulation and coding scheme used in a particular link. Since MAP messages contain critical information that needs to reach all users for that segment 409, the DL and UL-MAP 414, 416 may often be sent over a very reliable link, such as BPSK or QPSK with rate ½ coding and repetition coding.

The DL subframe 402 of the OFDMA frame 400 may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions. Altogether, the preamble 408, the FCH 410, and the DL-MAP 414 may carry information that enables the receiver 304 to correctly demodulate the received signal.

Likewise, the UL subframe 404 may include UL bursts of various bit lengths composed of the uplink data being communicated. Therefore, the UL-MAP 416, transmitted as the first DL burst in the DL subframe 402, may contain information about the location of the UL burst for different users. The UL subframe 404 may include additional control information as illustrated in FIG. 4, such as a UL Ranging subchannel 422 allocated for the mobile station to perform closed-loop time, frequency, and power adjustments during network entry and periodically afterward, as well as bandwidth requests. The UL subframe 404 may also include a UL ACK (not shown) allocated for the mobile station (MS) to feed back a DL hybrid automatic repeat request acknowledgment (HARQ ACK) and/or a UL CQICH (not shown) allocated for the MS to feed back channel state information on the Channel Quality Indicator channel (CQICH).

Different "modes" may be used for DL and UL transmission in OFDMA. An area in the time domain where a certain mode is used is generally referred to as a zone. One type of zone is called a DL-PUSC (downlink partial usage of subchannels) zone 424 and may not use all the subchannels available to it (i.e., a DL-PUSC zone 424 may only use particular subchannels). The DL-PUSC zone 424 may be divided into a total of six subchannel groups, which can be assigned to up to three segments 409. Thus, a segment 409 may contain one to six subchannel groups (e.g., segment 0 may contain two subchannel groups 0 and 1, segment 1 may contain two subchannel groups 2 and 3, and segment 2 may contain two subchannel groups 4 and 5 as illustrated in FIG. 4). Another type of zone is called a DL-FUSC (downlink full usage of subchannels) zone 426. Unlike DL-PUSC, DL-FUSC does not use any segments, but can distribute all bursts over the complete frequency range.

Typically, a frequency reuse factor (K) of 3 is used in which the DL-PUSC zone 424 may be divided into three segments 409 in the frequency domain according to subchannels. In this scheme, each segment 409 may be composed of two subchannel groups as illustrated in FIG. 4 and described above. The subcarriers in each subchannel group may not be contiguous. Furthermore, each base station 104 may have N sector antennas (e.g., N=3) on the same cell site in an effort to transmit in N different directions, leading to a frequency reuse pattern of N/K (e.g., equal to 3/3). In this manner, the cells 102 may be divided into three sectors 112, and each segment 409 of the DL-PUSC zone 424 may be associated with one sector 112.

However, one problem with a frequency reuse factor of three (K=3) is that the downlink transmission for a particular segment can only use one third of the total bandwidth (e.g., 5 MHz for WiMAX). Therefore, the maximum throughput of a mobile station may be limited to one third of the bandwidth of the total allocated spectrum.

Furthermore, a mobile station may be running various services concurrently. For example, a wireless device user may be surfing the Internet, watching a video stream, and voice communicating at the same time. If all of these services were to be served by one segment, some links to these services may be rejected when the sector is loaded and does not have sufficient bandwidth to accommodate all the links. Alternatively, if all of the links were to be established, the date rate of each service may most likely be reduced to meet the capacity constraint of one single segment.

An Example Method for Three-Way Concurrent Processing

In an effort to increase the throughput per mobile station (MS), different downlink connections may be established using multiple segments in an OFDMA frame. This may allow the MS to utilize bandwidth from different segments (up to the full bandwidth of the allocated spectrum) and may alleviate the bandwidth demand on any one particular sector.

Figure 5:
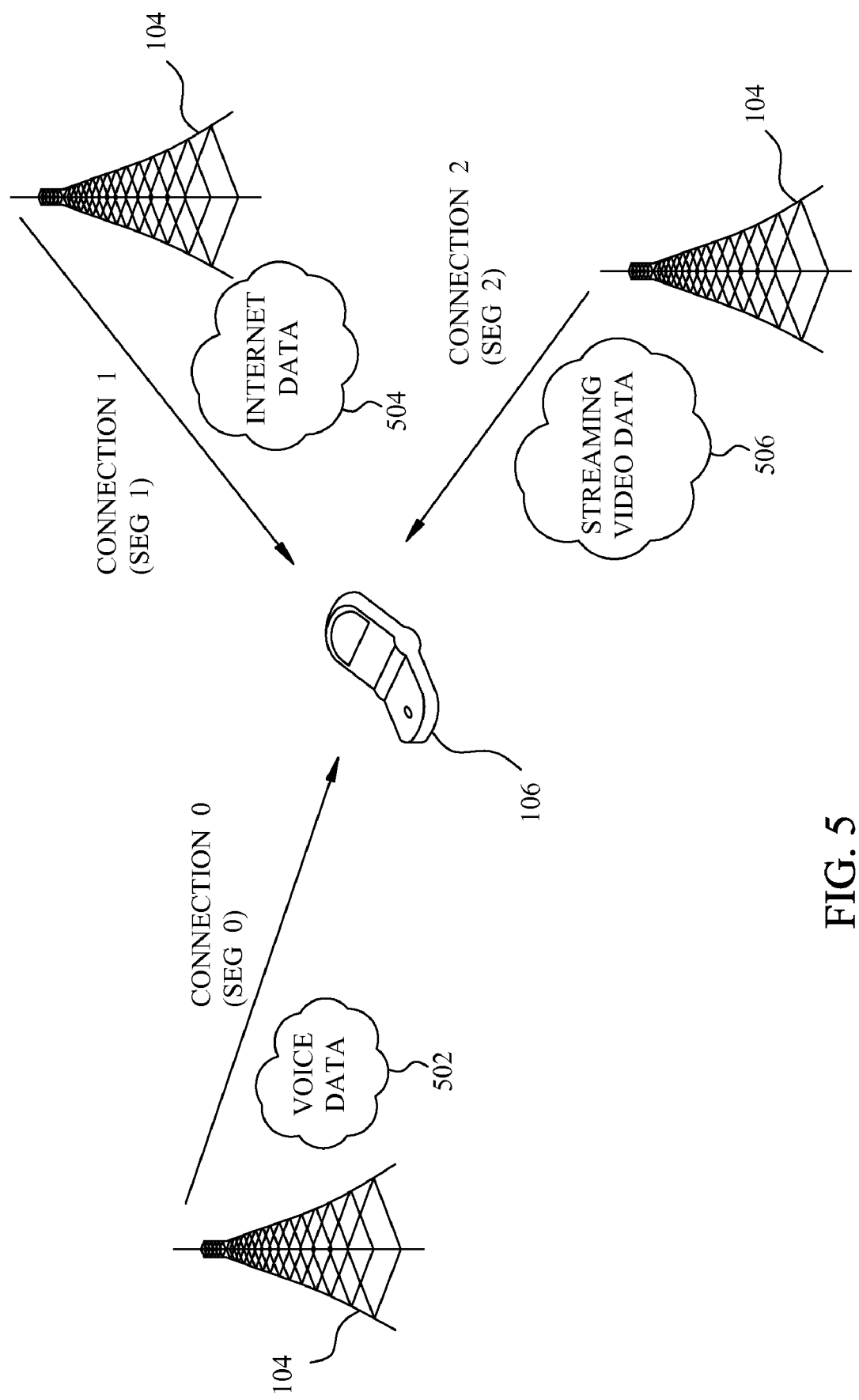
FIG. 5 illustrates three connections with different data between a wireless device and three base stations for three-way concurrent processing, in accordance with certain embodiments of the present disclosure.

FIG. 5 illustrates such a concurrent processing scheme, with three connections (Connection 0, Connection 1, and Connection 2) with different data between a user terminal 106 and three base stations 104 for three-way concurrent processing, according to a frequency reuse factor of 3. The DL data being transmitted may be different data from the same service or, as illustrated in FIG. 5, may comprise data from different services, such as voice data 500, Internet data 502, and streaming video data 504.

The DL data from each connection may be transmitted to the user terminal 106 in a different segment 409 of the DL-PUSC zone 424. For example, data for Connection 0 may be transmitted as one or more DL data bursts in Segment 0, data for Connection 1 may be transmitted as DL data bursts in Segment 1, and data for Connection 2 may be transmitted as DL data bursts in Segment 2. In this manner, the user terminal 106 may be able to establish and maintain all three connections, concurrently receiving different DL data potentially from different services without reducing the data rate of any service, at least up to the limit of the bandwidth allocated per segment.

Figure 6:
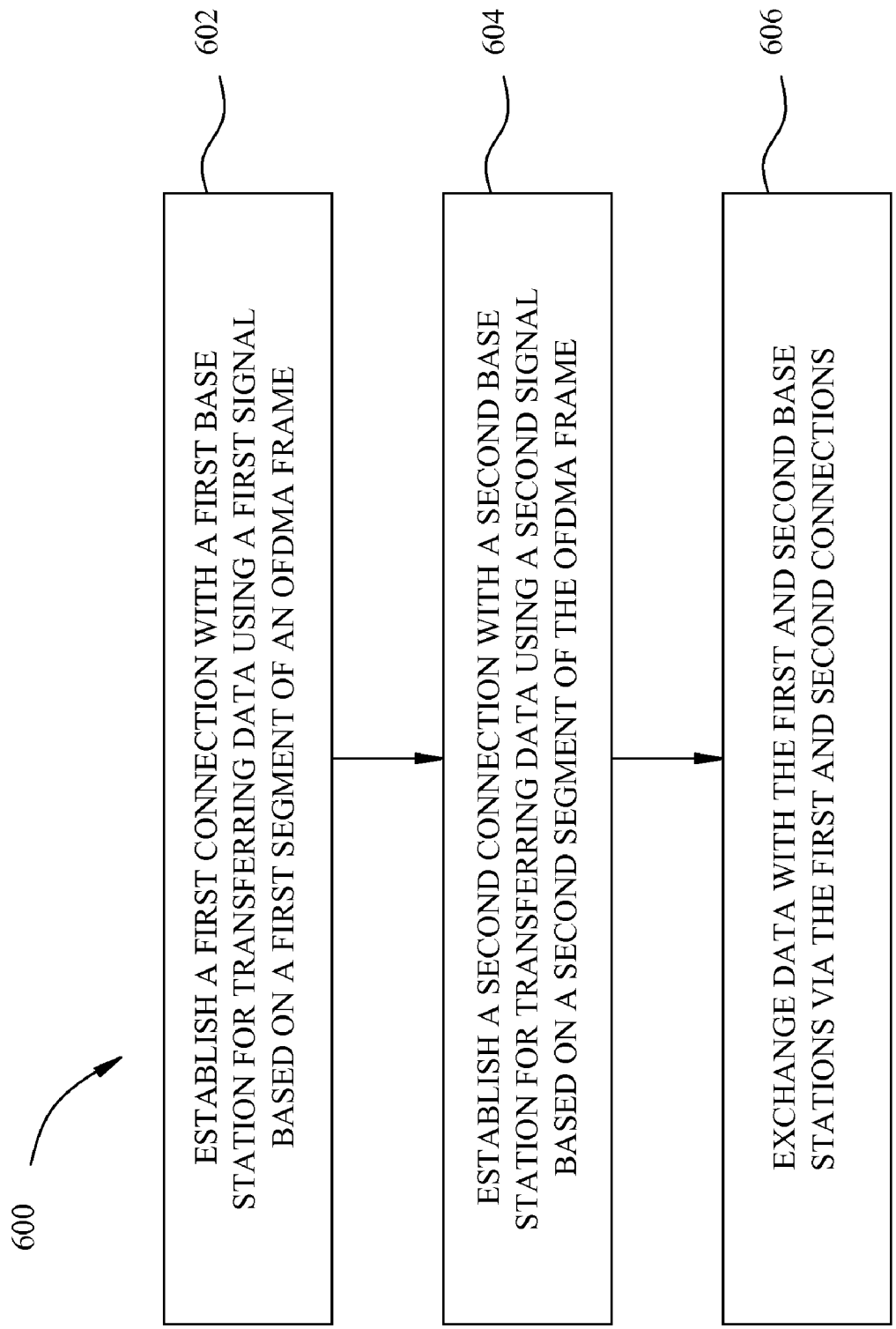
FIG. 6 is a flow chart of example operations for establishing and exchanging data using multiple connections between a wireless device and multiple base stations via segments of an OFDMA frame, in accordance with certain embodiments of the present disclosure.

FIG. 6 is a flow chart of example operations 600 for establishing and exchanging data using multiple connections between a wireless device and multiple base stations in a mobile WiMAX system, for example, via segments of an OFDMA frame. The operations 600 may begin, at 602, by establishing a first connection with a first base station for transferring data using a first signal based on a first segment of an OFDMA frame. At 604, a second connection with a second base station may be established for transferring data using a second signal based on a second segment of the same OFDMA frame. Data may be transferred from the first and second base stations to the wireless device using the first and second connections at 606. From the operations 600, two-way concurrent processing may commence. Three-way concurrent processing/traffic transfer may occur at 606 if a third connection with a third base station was established after 604 using a third signal based on a third segment of the same OFDMA frame for K=3.

Figure 7:
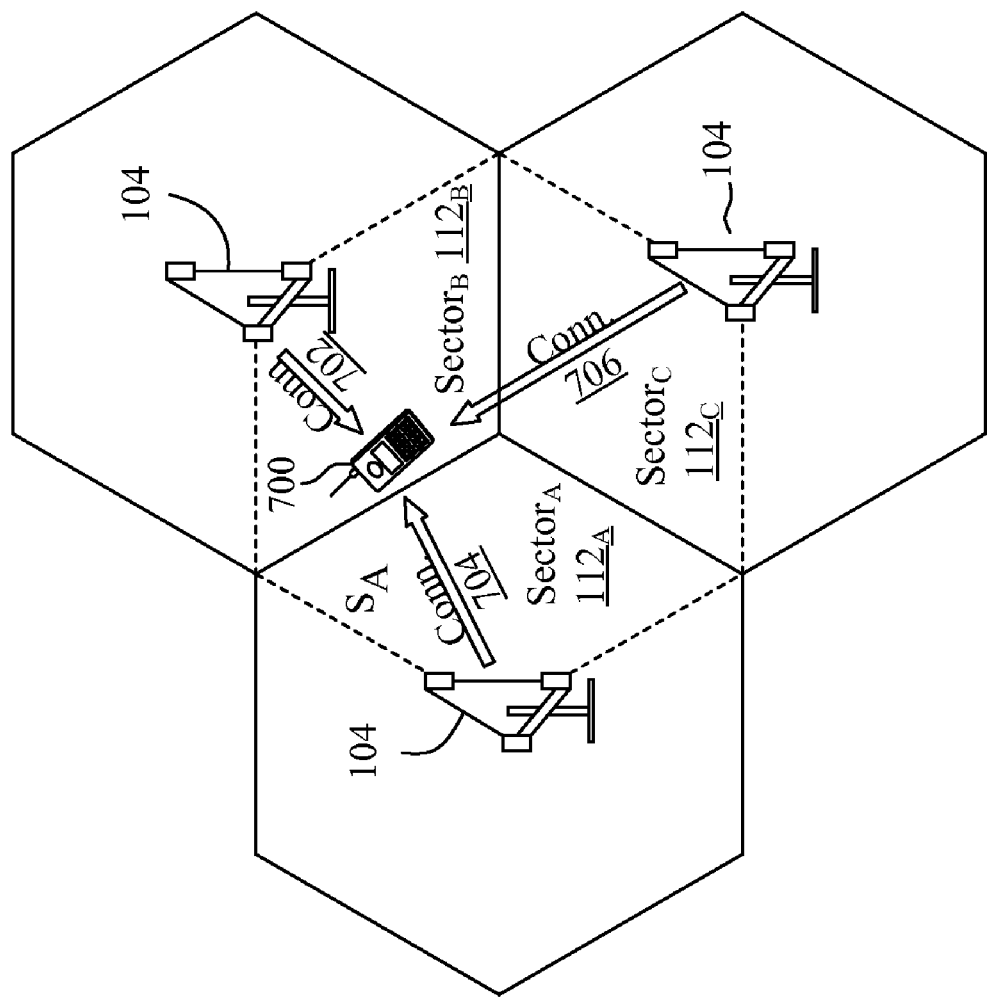
FIG. 7 illustrates an example scenario for three-way concurrent processing, three-way handover, or a hybrid scheme between them, in accordance with certain embodiments of the present disclosure.

For example, FIG. 7 illustrates an example scenario for three-way concurrent processing. In FIG. 7, a wireless device 700 located in sector B 112$_B$ may receive signals from at least three different base stations 104. A first connection 702 between the base station providing coverage for sector B 112$_B$ and the wireless device 700 may be established. The first connection 702 may use segment 0, for example, of an OFDMA frame in an effort to transmit DL data of a particular service to the wireless device 700. A second connection 704 may be established between the base station providing coverage for sector A 112$_A$ and the wireless device 700, and a third connection 706 may be established between the base station providing coverage for sector C 112$_C$ and the wireless device 700. The second and third connections 704, 706 may use segment 1 and segment 2, for example, of the same OFDMA frame in an effort to simultaneously transmit different DL data to the wireless device 700.

In order for the receiver 304 of the user terminal 106 to demodulate, decode, and interpret the DL data received from the multiple connections, the receiver 304 may time align the different segments so that they may be synchronized to line up with the boundary of the OFDMA frame. This temporal alignment issue may arise because the different base stations may not be synchronized (i.e. asynchronous base station timing) in some wireless systems and furthermore, because of the different propagation delays from the different base stations 104 to the user terminal 106.

Figure 8:
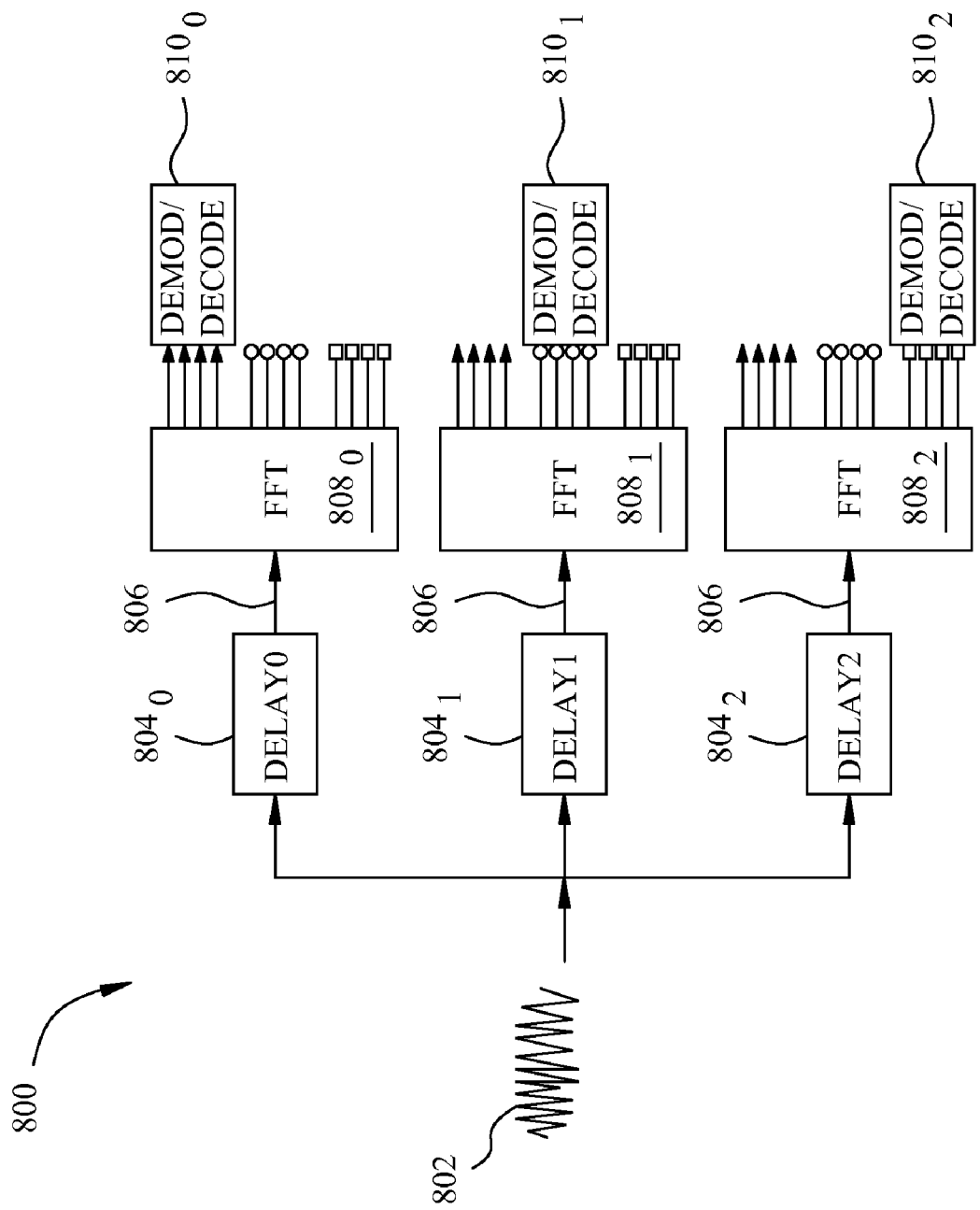
FIG. 8 illustrates a receiver block diagram configured to time align segments of an OFDMA frame received from three different base stations, in accordance with certain embodiments of the present disclosure.

FIG. 8 illustrates an example receiver block diagram 800 configured to time align the various segments 409 of an OFDMA frame received from three different base stations 104. The received signal 802 may have three different time adjustments applied in the delay blocks 804, each time adjustment based on the delay from one of the base stations. The segments may be synchronized using the pilots of the preamble 408, for example, and the delay may be applied in the delay blocks 804 accordingly to produce time-aligned signals 806. A fast Fourier transform (FFT) may be applied to each of the time-aligned signals 806 in the FFT blocks 808 to transform these signals from the time-domain into the frequency-domain.

Once the time-aligned signals 806 have been transformed into the frequency-domain, the data for certain subchannels may be extracted according to the subchannel groups indicated in the DLFP 412 of the FCH 410 for a particular segment 409. The extracted data for a particular segment may be demodulated and decoded in the Demodulator/Decoder blocks 810 in order to interpret the downlink data from the three connections.

Figure 9A:
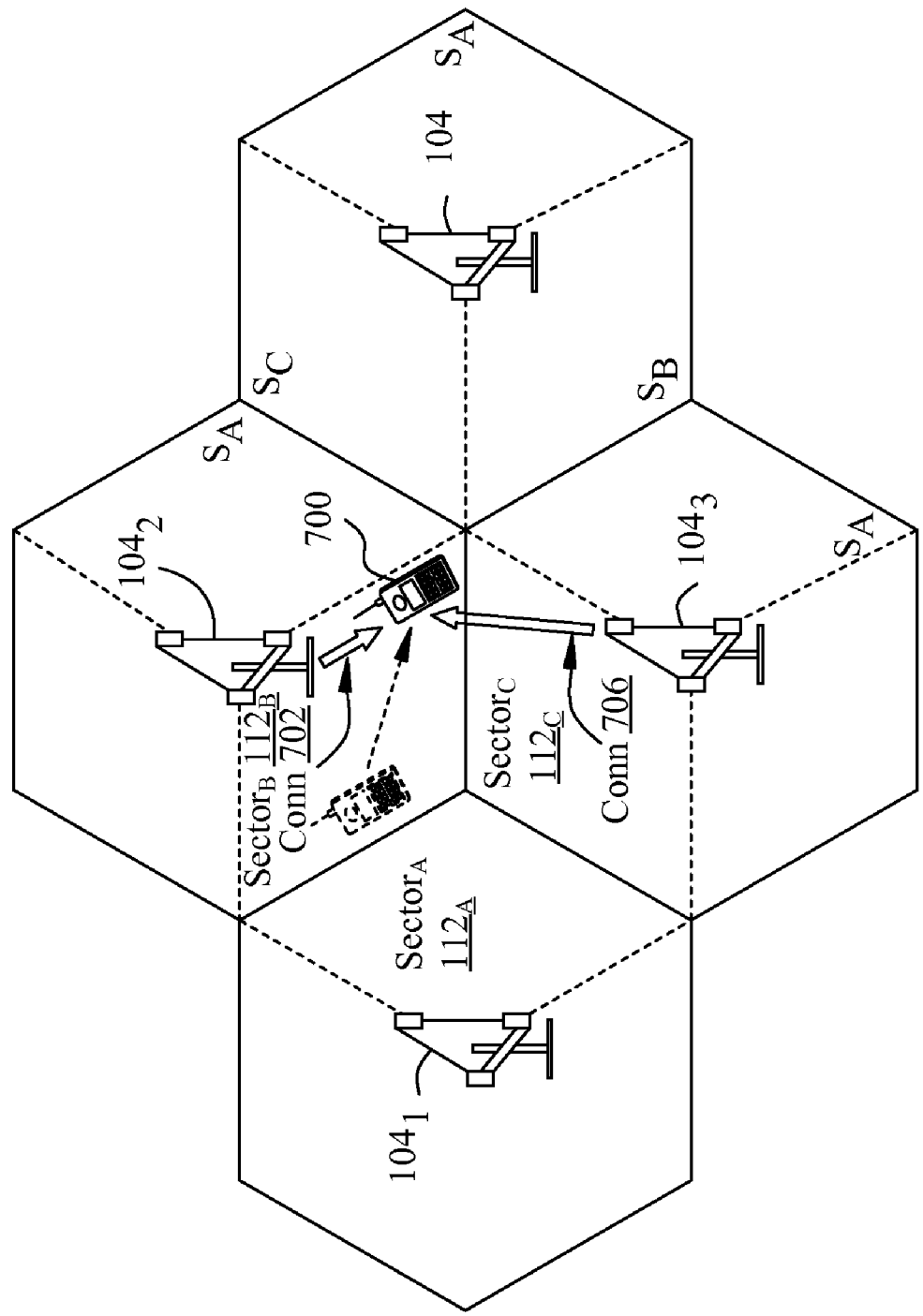
FIGS. 9A-B illustrate scenarios for deleting existing connections and adding new connections as a wireless device changes locations from a starting location in FIG. 7, in accordance with certain embodiments of the present disclosure.

As a wireless device changes location, signals received from a certain base station may become too weak to use with acceptable bit error ratio (BER) to achieve a minimum quality of service (QoS) for a particular type of service, and therefore this connection may be dropped. However, the wireless device may move closer to another base station with a stronger signal, and a new connection may be established to replace the dropped connection. For example, the wireless device 700 of FIG. 7 may move far enough away from the base station 104$_1$ serving sector A 112$_A$ such that the second connection 704 is dropped, as illustrated in FIG. 9A. If there is not another base station with a signal strong enough to provide a new connection, the wireless device may operate with two-way concurrent processing, having only the first and third connections 702, 706 to transfer data.

Figure 9B:
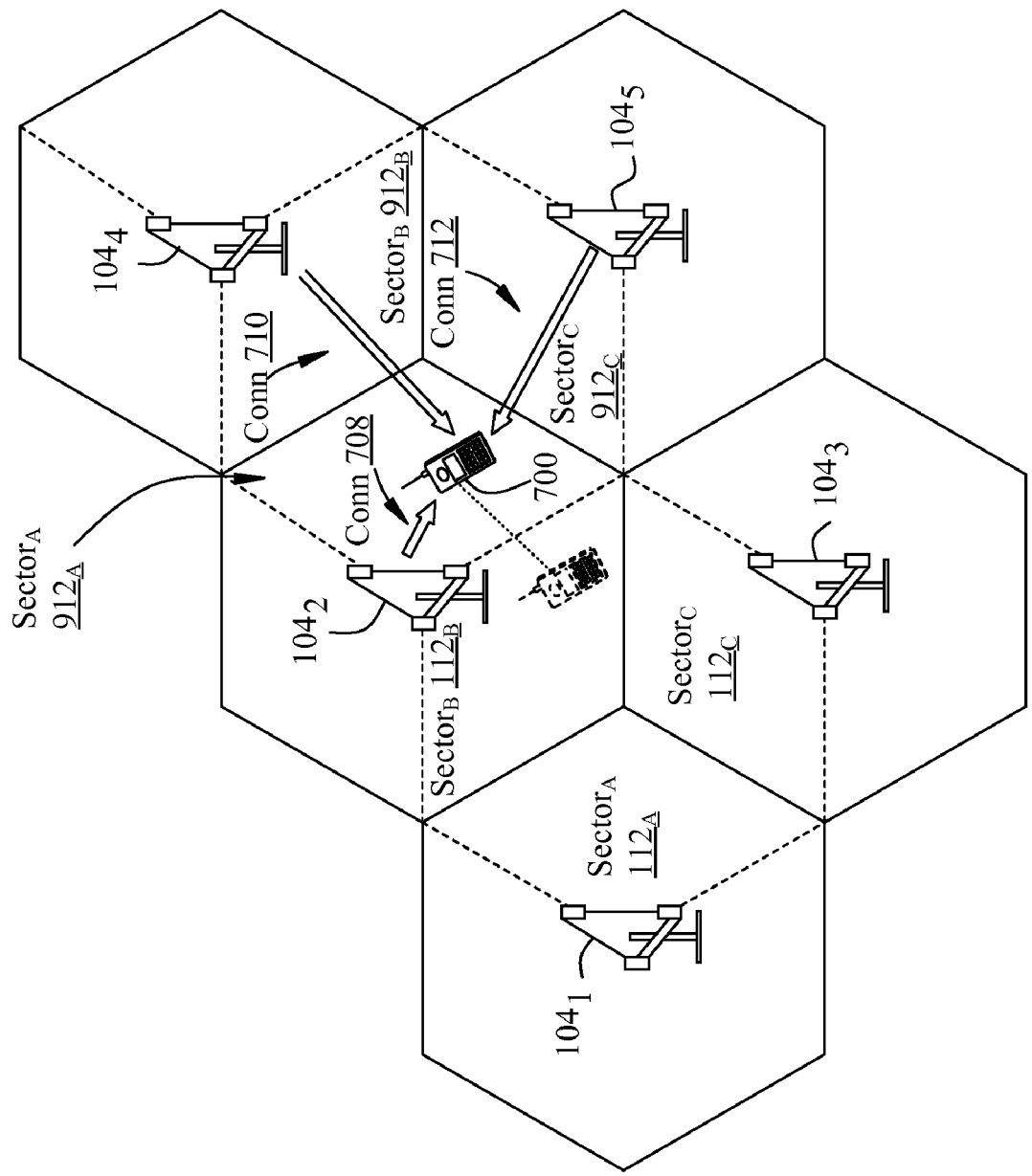

Referring now to FIG. 9B, the wireless device 700 may continue moving and enter a new sector A 912$_A$, wherein the new sector A 912$_A$ uses the same subchannel groups as the segment 409 for the previously described sector A 112$_A$. The signal strength from the sector B antenna of the second base station 104$_2$ providing coverage for sector B 112B may be too weak, and the wireless device 700 may also receive a strong signal from the sector A antenna of the second base station 104$_2$ providing coverage for the new sector A 912$_A$. Hence, the first connection 702 may be dropped, and a fourth connection 708 may be established with the wireless device 700.

Now that the wireless device 700 may be operating with two-way concurrent processing and the segment associated with sector B is not being used, the wireless device may be able to add a new connection to a fourth base station 104$_4$. The fourth base station 104$_4$ may provide coverage for a different sector B 912$_B$, wherein the new sector B 912$_B$ uses the same subchannel groups as the segment 409 for the previously described sector B 112$_B$. Once the signal from the fourth base station 104$_4$ as received by the wireless device 700 is strong enough, a fifth connection 710 may be established with the wireless device 700, such that the wireless device again operates with three-way concurrent processing to increase its DL data throughput.

As the wireless device 700 continues to move, the device may move far enough away from the third base station 104$_3$ serving sector C 112$_C$ such that the third connection 706 is dropped, as illustrated in FIG. 9B. The device may have been or, as it moves closer, may start receiving signals from a fifth base station 104$_5$, and the device may be able to add a new connection. The fifth base station 104$_5$ may provide coverage for a different sector C 912$_C$, wherein the new sector C 912$_C$ uses the same subchannel groups as the segment 409 for the previously described sector C 112$_C$. Once the signal from the fifth base station 104$_5$ as received by the wireless device 700 is strong enough, a sixth connection 712 may be established with the wireless device 700, such that the wireless device again operates with three-way concurrent processing to increase its DL data throughput.

Figure 10A:
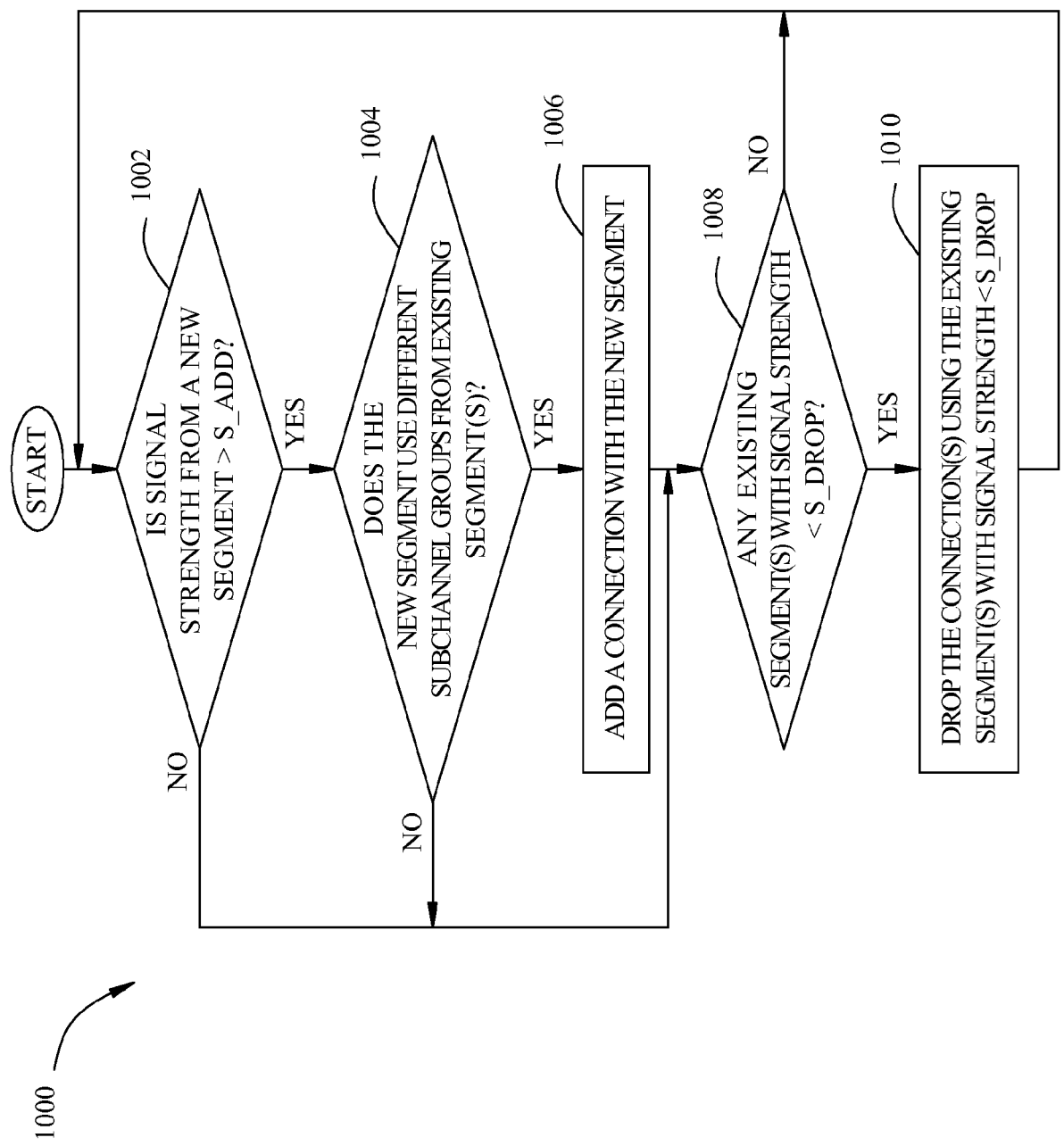
FIGS. 10A and 10B illustrate flow charts of example operations for adding new connections and deleting existing connections based on strength of signals received at a wireless device, in accordance with certain embodiments of the present disclosure.

FIG. 10A is a flow chart of example operations 1000 for adding new connections and deleting existing connections based on strength of signals received at a wireless device in a mobile WiMAX system, for example. In this manner, the wireless device may continuously monitor the signal strength of existing segment(s) being processed and the signal strength of potential new segments not currently being processed.

The operations 1000 may begin, at 1002, by determining whether the preamble signal strength from a new segment (i.e., a new sector) as received by the wireless device is greater than an add threshold (S_ADD). If so, then at 1004, whether the new segment uses different subchannel groups from the existing segments with previously established connections may be determined. Therefore, if the new segment has signal strength greater than S_ADD and uses different subchannel groups than existing segments, a connection using the new segment may be added to the wireless device. However, if the new segment has a signal strength less than or equal to S_ADD at 1002 or uses the same subchannel groups as existing segments at 1004, the connection using the new segment may not be added.

At 1008, whether any existing segments with established connections have a preamble signal strength less than a drop threshold (S_DROP) may be determined. If so, then at 1010, established connection(s) using existing segments with the low signal strength may be dropped at 1010, and the operations 1000 may repeat starting at 1002. If there are no existing segments with signal strength less than S_DROP, the operations may repeat at 1002.

Figure 10B:
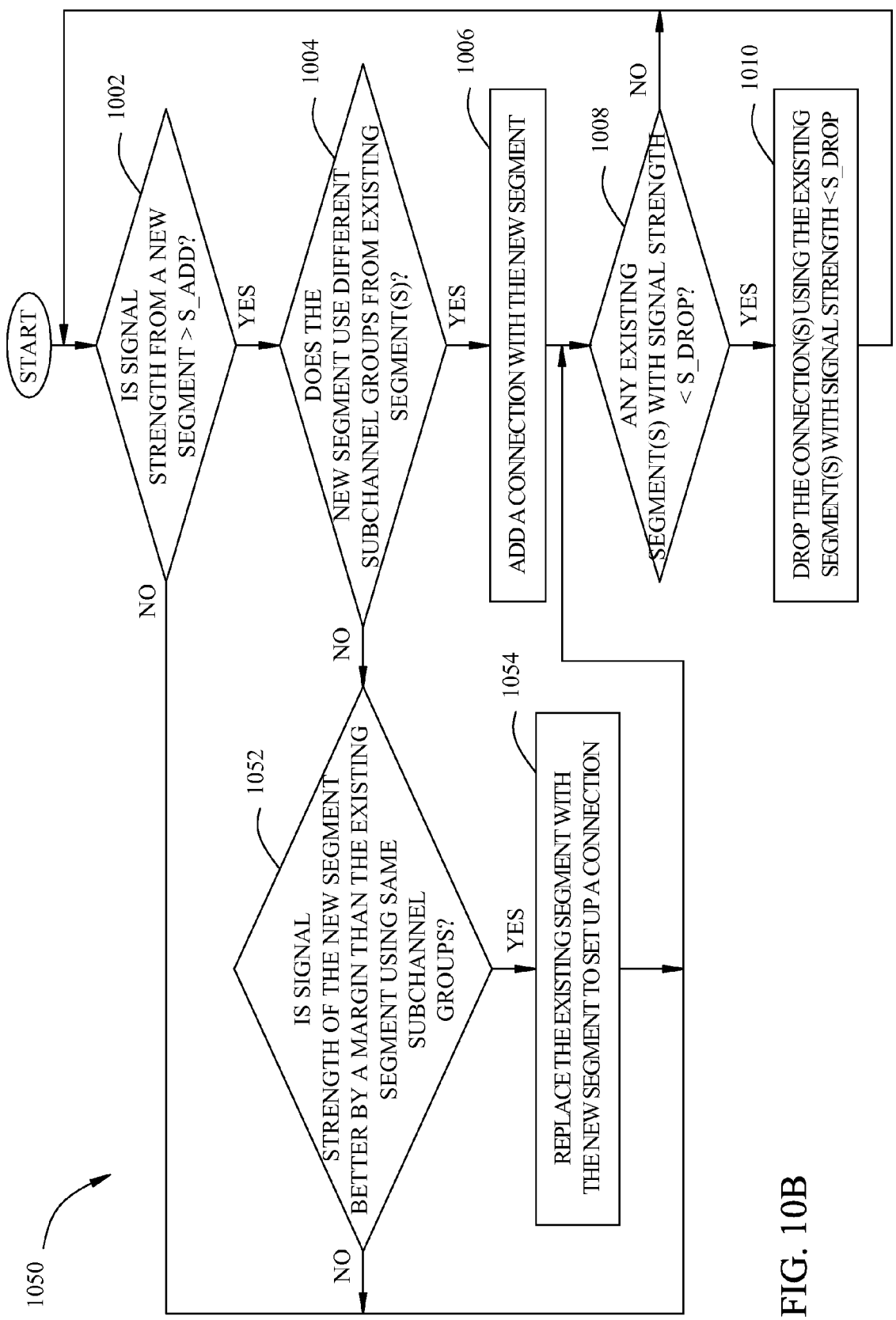

For some embodiments as illustrated in the operations 1050 of FIG. 10B, if the preamble signal strength of a new segment is greater than S_ADD at 1002, but the new segment uses the same subchannel groups as the existing segment(s) at 1004, a connection with the new segment may still be established. At 1052, whether the signal strength of the new segment is better by a certain margin than the existing segment using the same subchannel groups may be determined. If not, the connection using the new segment may not be added. However, if the signal strength of the new segment is significantly better (i.e., better than the existing segment by the margin), than the connection using the existing segment may be replaced with a new connection using the new segment at 1054 before determining whether any existing segments have a signal strength below S_DROP at 1008. In this manner, a new connection having a segment with a better signal strength may be added without having to wait for a connection using any existing segment with a weak signal strength (e.g., below S_DROP) to be deleted.

Exemplary Three-Way Handover

Conventionally in mobile WiMAX, a mobile station may communicate only with one serving base station at a time. This base station allocates bandwidth to the mobile station based on the base station's scheduler algorithm. To switch services from one base station to another (or from one sector to another), the mobile station typically performs a handover (also known as a handoff) to switch from its serving base station to a target base station. Also conventionally, the mobile station can only use bandwidth (e.g., certain subchannel groups) from its serving base station, but cannot use bandwidth from non-serving base stations providing coverage in neighboring sectors.

In an effort to increase the data throughput for one segment, according to certain embodiments of the present disclosure, different downlink connections may be established using multiple segments (e.g., two or three) in an OFDMA frame, such that each DL connection transmits data through only one segment as described above for concurrent processing. However, the mobile station may receive and parse the multiple segments at the same time. The multiple segments may contain data from the same service such that the mobile station may select the segment (from the connections with multiple base stations) that offers the mobile station the best bandwidth grant and may communicate with the selected segment. The mobile station may change the selection of the best segment on an OFDMA frame-by-frame basis, which may be considered as a multi-way handover (e.g., a three-way handover between three different base station sectors for a frequency reuse factor of three). As such, the mobile station may view all of the multiple segments received as coming from serving sectors. This scheme of multi-way handover may allow the mobile station to increase the data throughput within a segment, although the segment used may be changing.

Figure 11:
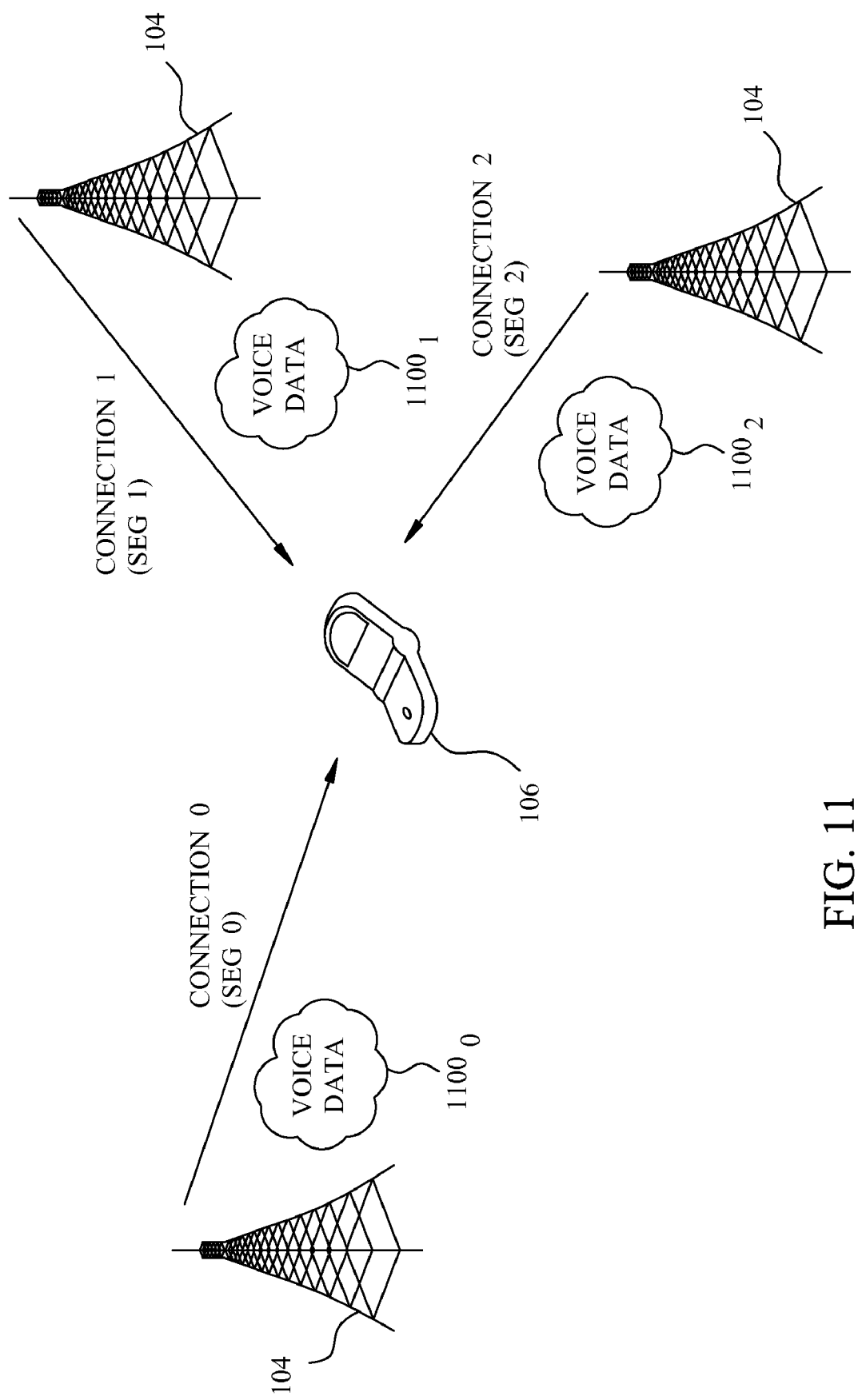
FIG. 11 illustrates three connections with different data between a wireless device and three base stations for three-way handover, in accordance with certain embodiments of the present disclosure.

FIG. 11 illustrates such a handover scheme for increased data throughput, with three connections (Connection 0, Connection 1, and Connection 2) with different data between a user terminal 106 and three base stations 104 for three-way handover, according to a frequency reuse factor of 3. The DL data being transmitted may be data from the same service, such as voice data 1100 (as shown), Internet data, or streaming video data. The DL data from each connection may be transmitted to the user terminal 106 in a different segment 409 of the DL-PUSC zone 424. For example, data for Connection 0 may be transmitted as one or more DL data bursts in Segment 0, data for Connection 1 may be transmitted as DL data bursts in Segment 1, and data for Connection 2 may be transmitted as DL data bursts in Segment 2. In this manner, the user terminal 106 may be able to establish and maintain all three connections as described above in the operations 600 of FIG. 6, selecting the segment with the best bandwidth grant for communication. The user terminal 106 may ignore the other two segments until one of these segments offers the best bandwidth grant in a subsequent OFDMA frame.

Exemplary Hybrid Handover/Concurrent Processing

For some embodiments, the multi-way concurrent processing and handover schemes described above may be combined to form a hybrid scheme. As an example with K=3, three connections may be established with a mobile station. Two of the connections (e.g., Connection 0 and 1 using segments 0 and 1 of an OFDMA frame) may have DL data from the same service with similar data, and the third connection (e.g., Connection 2 using segment 2) may have DL data from a different service. The mobile station may select between segments 0 and 1 depending on which segment offers the best bandwidth grant (for a two-way handover) and may perform concurrent processing with DL data from the selected segment and from segment 2 in an effort to increase the bandwidth usage.

Exemplary Multiple WiMAX Connections

FIG. 12 is a chart 1200 comparing and listing the advantages of three-way concurrent processing, three-way handover, and a hybrid between them as described above. The chart 1200 lists the type 1202, provides a brief description 1204 of each type, and notes an advantage 1206 of each type over conventional K=3 schemes where the maximum throughput of a mobile station may be limited to one third of the bandwidth of the total allocated spectrum (e.g., 5 MHz for WiMAX).

Although embodiments of the present disclosure are described with respect to establishing two or three connections when considering a frequency reuse factor of 3, the techniques and apparatus described above may be expanded to work with other configurations. For example, for cells divided into six sectors, up to six connections may be established, and a subchannel group within the OFDMA frame may be used for each connection instead of a segment.

Figure 6A:
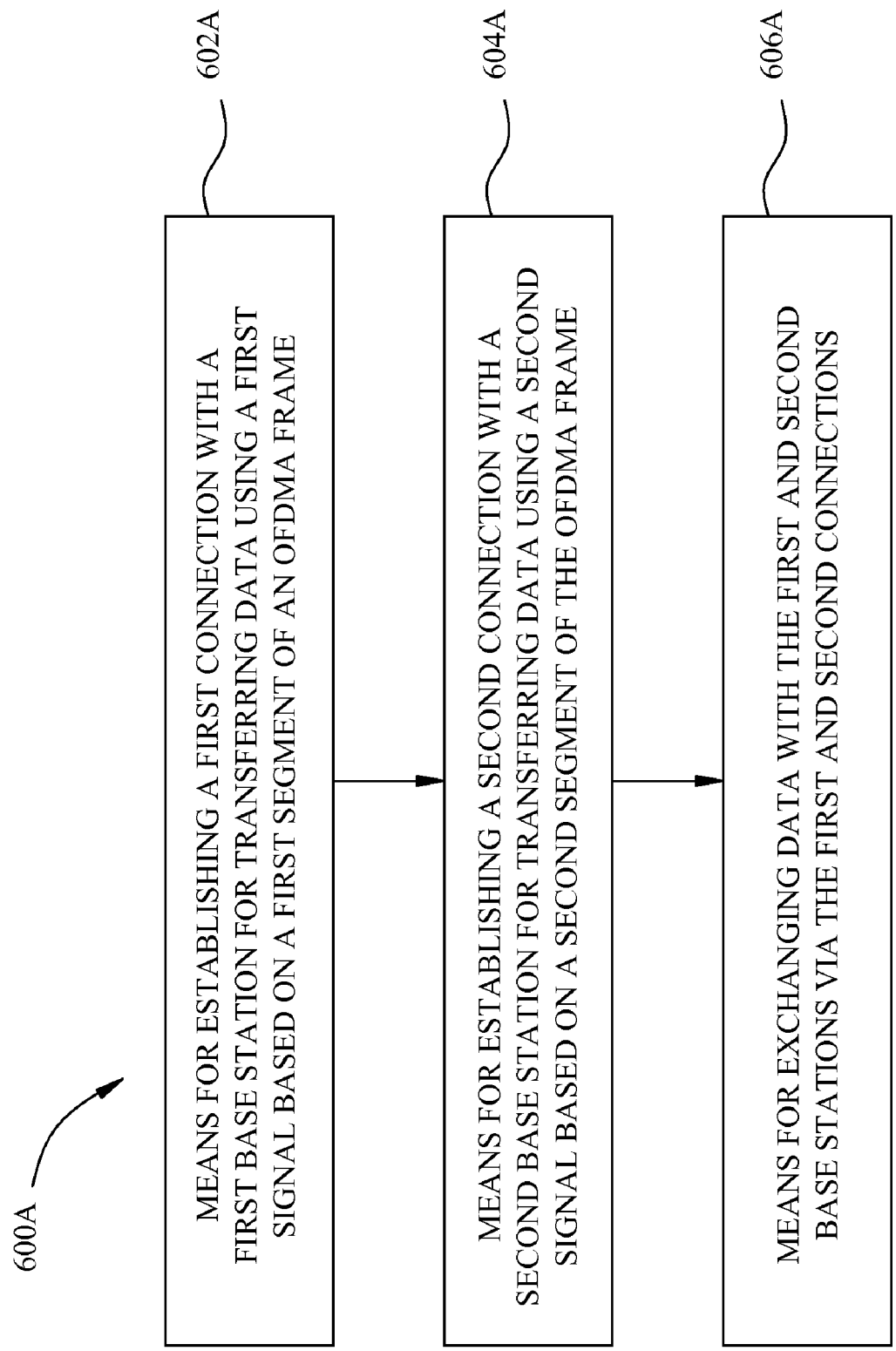
FIG. 6A is a block diagram of means corresponding to the example operations for establishing and using multiple connections of FIG. 6, in accordance with certain embodiments of the present disclosure.

The operations described above may be performed by various hardware and/or software component(s) and/or module(s) corresponding to a number of means-plus-function blocks. For example, the operations 600 of FIG. 6 described above may be performed by various hardware and/or software component(s) and/or module(s) corresponding to the means-plus-function blocks 600A illustrated in FIG. 6A. In other words, blocks 602 through 606 illustrated in FIG. 6 correspond to means-plus-function blocks 602A through 606A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication, comprising:
  establishing a first connection with a first base station, wherein the first connection involves the transfer of data using a first signal based on a first segment of an orthogonal frequency division multiple access (OFDMA) frame;
  establishing a second connection with a second base station, wherein the second connection involves the transfer of data using a second signal based on a second segment of the OFDMA frame; and
  exchanging data with the first and second base stations via the first and second connections within a time period bounded by the OFDMA frame, wherein the first and second segments comprise different downlink (DL) data.

2. The method of claim 1, further comprising concurrently processing the different DL data from the first and second segments.

3. The method of claim 2, wherein concurrently processing comprises adjusting for delays between the first and second signals based on the first and second segments, respectively.

4. The method of claim 3, wherein the delays comprise transmission delays between the first and second base stations and/or propagation delays in receiving the first and second signals based on the first and second segments, respectively.

5. The method of claim 1, further comprising:
establishing a third connection with a third base station, wherein the third connection involves the transfer of data using a third signal based on a third segment of the OFDMA frame; and
exchanging data with the first, second, and third base stations via the first, second, and third connections within the time period bounded by the OFDMA frame.

6. The method of claim 5, wherein the first, second, and third segments have different downlink (DL) data from three different services.

7. The method of claim 1, further comprising:
determining signal strength of the first and second signals; and
deleting one of the first and second connections whose signal strength is below a drop threshold.

8. The method of claim 1, further comprising:
determining signal strength of a third signal based on a third segment of an OFDMA frame; and
adding a third connection with a third base station if the signal strength of the third signal is above an add threshold and if the third segment uses different subchannel groups than the first or the second segments.

9. The method of claim 1, further comprising:
determining signal strength of a third signal based on a third segment of an OFDMA frame; and
replacing one of the first and second connections with a third connection to a third base station if the signal strength of the third signal is above an add threshold and is greater than a signal strength of the first or the second signal by at least a margin.

10. A receiver for wireless communication, comprising:
first connection-establishing logic configured to establish a first connection with a first base station, wherein the first connection involves the transfer of data using a first signal received by the receiver and based on a first segment of an orthogonal frequency division multiple access (OFDMA) frame;
second connection-establishing logic configured to establish a second connection with a second base station, wherein the second connection involves the transfer of data using a second signal received by the receiver and based on a second segment of the OFDMA frame; and
data logic configured to exchange data with the first and second base stations via the first and second connections within a time period bounded by the OFDMA frame, wherein the first and second segments have different downlink (DL) data and the data logic is configured to concurrently process the different DL data from the first and second segments.

11. The receiver of claim 10, wherein the data logic is configured to adjust for delays between the first and second signals based on the first and second segments, respectively.

12. The receiver of claim 10, further comprising third connection-establishing logic configured to establish a third connection with a third base station, wherein the third connection involves the transfer of data using a third signal based on a third segment of the OFDMA frame and wherein the data logic is configured to exchange data with the first, second, and third base stations via the first, second, and third connections within the time period bounded by the OFDMA frame.

13. An apparatus for wireless communication, comprising:
means for establishing a first connection with a first base station, wherein the first connection involves the transfer of data using a first signal based on a first segment of an orthogonal frequency division multiple access (OFDMA) frame;
means for establishing a second connection with a second base station, wherein the second connection involves the transfer of data using a second signal based on a second segment of the OFDMA frame; and
means for exchanging data with the first and second base stations via the first and second connections within a time period bounded by the OFDMA frame, wherein the first and second segments comprise different downlink (DL) data.

14. The apparatus of claim 13, further comprising means for establishing a third connection with a third base station, wherein the third connection involves the transfer of data using a third signal based on a third segment of the OFDMA frame and wherein the means for exchanging data is a means for exchanging data with the first, second, and third base stations via the first, second, and third connections within the time period bounded by the OFDMA frame.

15. A mobile device, comprising:
first connection-establishing logic configured to establish a first connection with a first base station, wherein the first connection involves the transfer of data using a first signal based on a first segment of an orthogonal frequency division multiple access (OFDMA) frame;
second connection-establishing logic configured to establish a second connection with a second base station, wherein the second connection involves the transfer of data using a second signal based on a second segment of the OFDMA frame; and
a receiver front end for receiving the first and second signals from the first and second base stations via the first and second connections within a time period bounded by the OFDMA frame, wherein the first and second segments comprise different downlink (DL) data.

16. The mobile device of claim 15, further comprising third connection-establishing logic configured to establish a third connection with a third base station, wherein the third connection involves the transfer of data using a third signal based on a third segment of the OFDMA frame and wherein the receiver front end is for receiving the first, second, and third signals from the first, second, and third base stations via the first, second, and third connections within the time period bounded by the OFDMA frame.

17. A non-transitory computer-readable medium containing a program for wireless communication, which, when executed by a processor, performs operations comprising:
establishing a first connection with a first base station, wherein the first connection involves the transfer of data using a first signal based on a first segment of an orthogonal frequency division multiple access (OFDMA) frame;
establishing a second connection with a second base station, wherein the second connection involves the transfer of data using a second signal based on a second segment of the OFDMA frame; and
transferring data using the first and second connections within a time period bounded by the OFDMA frame, wherein the first and second segments comprise different downlink (DL) data.

18. The non-transitory computer-readable medium of claim 17, further comprising concurrently processing different DL data from the first and second segments, wherein concurrently processing comprises adjusting for delays between the first and second signals based on the first and second segments, respectively.

19. The non-transitory computer-readable medium of claim 17, further comprising:

selecting between the first or the second segment based on a bandwidth grant, wherein the first and second segments are from the same service and have the same downlink (DL) data; and using the selected segment for wireless communication.

* * * * *